Patented Dec. 17, 1935

2,025,001

UNITED STATES PATENT OFFICE 2,025,001

BUTT WELDING PIPE

Walter T. Mahla, Lorain, and James Lester Mauthe, Elyria, Ohio, assignors to National Tube Company, a corporation of New Jersey No Drawing. Original application February 10, 1934, Serial No. 710,756. Divided and this application November 20, 1934, Serial No. 753,992

4 Claims. (Cl. 205—12)

This invention relates to the production of pipe by heating skelp in a furnace and then passing it through a welding bell, this being generally known to the trade as "the butt-welding process", and is a division from our co-pending application entitled "Butt-welding pipe", bearing Serial No. 710,756 and filed February 10, 1934. One of the objects is to apply oxidizing gases to the edges of the heated skelp in such manner that the skelp is not unduly burnt. Other objects may be inferred.

Our method of applying oxidizing gases to the edges of the skelp consists in successively applying heated air and a mixture of heated air and oxygen to the edges of the skelp after leaving the furnace and before passage through the welding bell. The volume of the air should be considerably greater than that of the mixture of air and oxygen, and the latter should be proportioned to contain from 20 to 65 per cent of oxygen by volume.

The large volume of air provides for an initial combustion of any scale or other substances on the edges of the heated skelp, whereby the temperatures of these edges are raised somewhat above that imparted by the furnace, whereupon the smaller volume of the mixture of air and oxygen momentarily exerts a violent oxidizing effect upon these same edges, this quickly further raising the temperatures.

The advantage of using the large volume of air first is that burning of the skelp is thereby avoided, the mixture of oxygen and air being sufficient to raise the temperature of the edges to the usually desired maximum. The proportions of the heated air and oxygen contained in the smaller volume of the mixture are advantageous because it has been found that this produces all the heat that is desired, without any undue burning.

We claim:

1. In the method of producing pipe by heating skelp in a furnace and then passing it through a welding bell, the step consisting in successively applying heated air and a mixture of air and oxygen to the edges of the skelp after leaving the furnace and before passage through the welding bell.

2. In the method of producing pipe by heating skelp in a furnace and then passing it through a welding bell, the step consisting in successively applying heated air and a mixture of air and oxygen to the edges of the skelp after leaving the furnace and before passage through the welding bell, the volume of the air being greater than that of the mixture of air and oxygen.

3. In the method of producing pipe by heating skelp in a furnace and then passing it through a welding bell, the step consisting in successively applying heated air and a mixture of air and oxygen to the edges of the skelp after leaving the furnace and before passage through the welding bell, said mixture being proportioned to contain from 25 to 35 per cent of oxygen.

4. In the method of producing pipe by heating skelp in a furnace and then passing it through a welding bell, the step consisting in successively applying heated air and a mixture of heated air and oxygen to the edges of the skelp after leaving the furnace and before passage through the welding bell, the volume of the air being greater than that of the mixture of air and oxygen and the latter being proportioned to contain from 20 to 65 per cent of oxygen.

JAMES LESTER MAUTHE.
WALTER T. MAHLA.